US007341089B2

(12) United States Patent
Puffe et al.

(10) Patent No.: US 7,341,089 B2
(45) Date of Patent: Mar. 11, 2008

(54) ROTARY APPLICATION HEAD AND LABELLING INSTALLATION FOR APPLICATION OF LABELS

(75) Inventors: Wolfgang Puffe, Buchholz-Mendt (DE); Eric Lingier, Straelen (DE)

(73) Assignee: Nordson Corporation, Westlake, OH (US)

( * ) Notice: Subject to any disclaimer, the term of this patent is extended or adjusted under 35 U.S.C. 154(b) by 140 days.

(21) Appl. No.: 11/294,636

(22) Filed: Dec. 5, 2005

(65) Prior Publication Data

US 2006/0201630 A1 Sep. 14, 2006

(30) Foreign Application Priority Data

Dec. 3, 2004 (DE) ...................... 10 2004 058 542

(51) Int. Cl.
*B65C 11/00* (2006.01)
*B32B 39/00* (2006.01)
*B05B 15/04* (2006.01)
*B05C 5/02* (2006.01)

(52) U.S. Cl. ............... 156/578; 156/521; 156/DIG. 24; 156/DIG. 34; 118/301; 118/325

(58) Field of Classification Search ................ 156/517, 156/578, 521, DIG. 24, DIG. 34; 118/210, 118/211, 214, 301, 325, 416, 419
See application file for complete search history.

(56) References Cited

U.S. PATENT DOCUMENTS 1,946,339 A 2/1934 Vigers et al.
2,414,873 A 1/1947 Herbst
2,697,446 A 12/1954 Harrington
2,957,489 A 10/1960 Fisher
3,126,574 A 3/1964 Fox
3,327,680 A 6/1967 Talbot
3,570,725 A 3/1971 Baker et al.
3,788,561 A 1/1974 Vilagi et al.
3,840,158 A 10/1974 Baker et al.
3,849,241 A 11/1974 Butin et al.
3,851,146 A 11/1974 Bennett
3,942,687 A 3/1976 Walus et al.

(Continued)

FOREIGN PATENT DOCUMENTS

CH 359086 A 12/1961

(Continued)

OTHER PUBLICATIONS

English Abstract of DE 198 54 634 C1.*

(Continued)

*Primary Examiner*—Philip Tucker
*Assistant Examiner*—Sing P. Chan
(74) *Attorney, Agent, or Firm*—Wood, Herron & Evans, LLP

(57) ABSTRACT

A system that applies strips of material, such as labels, to a cylindrical body, such as a bottle. The system includes a vacuum cylinder that holds the labels. The vacuum cylinder rotates bringing the labels into contact with a rotary application head that applies hot melt adhesive to the passing labels. The rotary application head includes a feed channel system that cooperates with a mask cylinder to controllably apply the adhesive. The adhesive covered label then is fixed to a bottle or other device that is rotating in a carousel.

23 Claims, 17 Drawing Sheets

U.S. PATENT DOCUMENTS

| | | | | |
|---|---|---|---|---|
| 4,108,705 | A * | 8/1978 | Hadl et al. | 156/355 |
| 4,220,114 | A | 9/1980 | Radowicz | |
| 4,324,816 | A | 4/1982 | Landis et al. | |
| 4,386,998 | A | 6/1983 | McIntyre et al. | |
| 4,516,702 | A | 5/1985 | Schmidt | |
| 4,534,388 | A | 8/1985 | Pall et al. | |
| 4,544,431 | A * | 10/1985 | King | 156/256 |
| 4,550,681 | A | 11/1985 | Zimmer et al. | |
| 4,572,435 | A | 2/1986 | Thompson | |
| 4,675,208 | A | 6/1987 | Kageyama et al. | |
| 4,687,137 | A | 8/1987 | Boger et al. | |
| 4,735,169 | A | 4/1988 | Cawston et al. | |
| 4,774,109 | A | 9/1988 | Hadzimihalis et al. | |
| 4,798,163 | A | 1/1989 | Claassen | |
| 4,962,871 | A | 10/1990 | Reeves | |
| RE33,481 | E | 12/1990 | Ziecker et al. | |
| 5,024,709 | A | 6/1991 | Faulkner, III et al. | |
| 5,027,976 | A | 7/1991 | Scholl et al. | |
| 5,078,168 | A | 1/1992 | Konieczynski | |
| 5,162,121 | A | 11/1992 | Kawaguchi et al. | |
| 5,335,825 | A | 8/1994 | Fort | |
| 5,336,320 | A | 8/1994 | Hogan et al. | |
| 5,342,647 | A | 8/1994 | Heindel et al. | |
| 5,407,101 | A | 4/1995 | Hubbard | |
| 5,423,889 | A | 6/1995 | Colquitt et al. | |
| 5,495,963 | A | 3/1996 | Miller et al. | |
| 5,535,919 | A | 7/1996 | Ganzer et al. | |
| 5,733,597 | A | 3/1998 | Schmitkons et al. | |
| 5,747,102 | A | 5/1998 | Smith et al. | |
| 5,753,350 | A | 5/1998 | Bright | |
| 5,772,106 | A | 6/1998 | Ayers et al. | |
| 5,934,520 | A | 8/1999 | Byerly et al. | |
| 5,964,974 | A * | 10/1999 | Hinton | 156/215 |
| 6,036,106 | A | 3/2000 | Peet | |
| 6,056,155 | A | 5/2000 | Byerly et al. | |
| 6,089,413 | A | 7/2000 | Riney et al. | |
| 6,164,568 | A | 12/2000 | Muller et al. | |
| 6,253,957 | B1 | 7/2001 | Messerly et al. | |
| 6,257,445 | B1 | 7/2001 | Means et al. | |
| 6,279,603 | B1 | 8/2001 | Czarnik et al. | |
| 6,296,463 | B1 | 10/2001 | Allen | |
| 6,422,428 | B1 | 7/2002 | Allen et al. | |
| 6,431,241 | B1 | 8/2002 | Gonzalo | |
| 6,464,785 | B1 * | 10/2002 | Puffe | 118/301 |
| 6,499,631 | B2 | 12/2002 | Zook | |
| 6,669,057 | B2 | 12/2003 | Saidman et al. | |
| 6,688,580 | B2 | 2/2004 | Jackson et al. | |
| 6,852,366 | B2 * | 2/2005 | Zschaeck | 427/356 |
| 6,866,209 | B2 * | 3/2005 | Puffe | 239/568 |
| 2002/0014201 | A1 | 2/2002 | Holmstrom | |
| 2004/0217202 | A1 | 11/2004 | Hynes | |
| 2005/0268845 | A1 | 12/2005 | Ganzer et al. | |
| 2005/0271806 | A1 | 12/2005 | Ganzer et al. | |

FOREIGN PATENT DOCUMENTS

| | | | |
|---|---|---|---|
| DE | 19706317 | A1 | 9/1998 |
| DE | 19854634 | C1 * | 2/2000 |
| DE | 10010952 | A1 | 9/2001 |
| DE | 10216356 | C1 * | 9/2003 |
| FR | 2205831 | | 5/1974 |
| GB | 2170178 | A | 7/1986 |
| GB | 2182269 | A | 5/1987 |
| WO | 03026893 | A | 4/2003 |
| WO | 98/19916 | A1 | 7/2006 |

OTHER PUBLICATIONS

Nordson Corporation, Nordson Drawing No. 803083, May 19, 1980.

Slautterback Corporation, Multiline Extrusion Applicators ML 400 Series, Technical Bulletin TB033, revised Jul. 20, 1990.

Slautterback Corporation, Multiline Extrusion Applicators ML 400 Series, Technical Bulletin TB033, revised Mar. 1, 1990.

Nordson Corporation, The Melting Pot, New Multi-Orifice Nozzle, Internal Publication of Nordson Corporation, vol. 2, Issue 1, Jan. 1981.

Acumeter Laboratories Incorporated, Wide Band Extrusion Nozzles, May 1983.

Nordson Corporation, Multi-Line Nozzle, a page from Technical Bulletin, p. 30, Oct. 1986.

Nordson Corporation, Series 700 Electric Guns, Brochure, 1996.

Nordson Corporation, Series E-350 Electric Guns, Brochure, 1997.

Nordson Corporation, Speed-Coat (TM) Slot Applicator, Brochure, 2003.

Barry-Wehmiller, Model 4500 Trine Roll-Fed Labeling System, undated, 2 pgs.

Barry-Wehmiller, Model 6700 Trine Roll-Fed Labeling System, undated, 2 pgs.

Krones, Krones Canmatic, Wrap-around labelling, undated, 7 pgs.

B&H Labeling Systems, Marathon XL Roll-Fed Labeler, undated, 1 pg.

Trine Labeling Systems, The Quick Change(TM) 4400, 2003, 1 pg.

Nordson Corporation, Amherst, Ohio 44001, Nordson Drawing No. 803070, May 16, 1980.

European Patent Office, European Search Report in EP Application No. 05025150, Mar. 21, 2006.

European Patent Office, International Search Report and Written Opinion from corresponding PCT Application No. PCT/US2006/024899, Dec. 1, 2006.

European Patent Office, European Search Report from Corresponding EP Application No. 05026304.5, Nov. 17, 2006.

* cited by examiner

ROTARY APPLICATION HEAD AND LABELLING INSTALLATION FOR APPLICATION OF LABELS

TECHNICAL FIELD OF THE INVENTION

The invention relates to a rotary application head for application of liquid adhesives, especially hot melt adhesives, on strip material which is running past, and a labelling installation for applying labels to cylindrical bodies, such as bottles.

BACKGROUND OF THE INVENTION

Rotary application heads for known bottle labelling installations have a rotating roller having adhesive placed two-dimensionally on certain application areas in the interior of the housing. The application areas of the rotating roller having the adhesive are then brought in contact with passing label material. In this case, the rotating roller emerges from the housing in the area of an application gap so that contact with the label material takes place immediately. Rotary application heads of this type tend to take up dirt via the adhesive covered application areas and draw it into the rotary application head.

Accordingly, it is one object of the present invention to prepare an improved rotary application head suitable for the application of adhesive to passing label material. Liquid adhesive is applied to labelling strip materials or individual labels depending on whether the printed labelling strip material is separated into single labels before passing the rotary application head or after passing the rotary application head.

The rotary application head described herein has the advantage of absolute synchronisation between the adhesive medium and the label material that is running past. Accordingly, no smearing of the adhesive with respect to the label material is possible.

In addition, a flat contact between the label material and the adhesive medium to be applied is avoided. Rather, the adhesive medium is transferred by means of a mask cylinder in a grid fashion. The adhesive medium can then flow together outside the mask cylinder through shallow recesses proximate to outlet openings on the outside of the mask cylinder. Thus, the surface areas of the label material can also be covered with adhesive.

A rotary application head that includes a rotating hollow cylinder in the fashion of a mask cylinder is known from DE 198 54 634 C1. However, the mask cylinder described in DE 198 54 634 C1 fails to emerge from the housing. The mask cylinder in DE 198 54 34 634 C1 rotates around its own axis and never emerges from the housing. Furthermore, in DE 198 54 634 C1, a compressed-air slit is associated with a slit in the housing. The slit is in the interior of the hollow cylinder or mask cylinder in the vertical cylinder. The compressed air blows out adhesive medium inserted previously into openings in the hollow cylinder or mask cylinder. Unlike the present application having a rotary application head transferring adhesive medium via contact with the strip material, the rotary application head described in DE 198 54 634 C1 is only suitable for non-contact application to passing strip material.

SUMMARY OF THE INVENTION

A rotary application head for application of liquid adhesives, especially hot melt adhesives, on passing strip material. The strip material can be labels in one embodiment. The labels provided with the adhesive can be applied to any type of product. One excellent area of application is applying the labels to cylindrical bodies, such as cans or bottles. The labels can consist of paper or other non-self-adhesive film-like material.

Another aspect of the invention relates to a labelling installation for applying labels to cylindrical bodies, such as bottles. The labelling installations include an unrolling device for label strip material. The installations also include a rotating drivable vacuum drum for supplying label strip material or individual labels and a cutting device for separating individual labels from label strip material. The labelling installations also include a rotating application head for liquid adhesive, such as hot melt adhesive, that cooperates with the vacuum drum. The labelling installations also include a carousel for passing the cylindrical body past the vacuum drum the carousel having rotating means for the cylindrical bodies that bring about a rolling of the cylindrical bodies on the vacuum drum. The labelling installations further include means for charging and discharging the cylindrical bodies onto and from the carousel. The axes of the vacuum drum, rotary application head and carousel are arranged parallel to one another.

Another form of the invention includes a rotary application head for application of liquid adhesive, such as hot melt adhesive, to a strip material which is running past, such as label strip material or individual labels. The rotary application head includes a housing with a cylindrical chamber that passes through the housing in an axially parallel application gap. Arranged coaxially in the cylindrical chamber is a vertical feed cylinder forming a cylindrical annular space in combination with the cylindrical chamber. The cylindrical annular space is interrupted by the application gap and includes at least one feed channel system running parallel to the application gap. Arranged rotatably drivably in the cylindrical annular space is a mask cylinder. The mask cylinder has outlet openings that expose in a controlled fashion the feed channel system in the feed cylinder. The feed channel system in the feed cylinder is exposed through the outlet openings during rotation towards the application gap.

In one preferred embodiment, at least one feed channel system in the feed cylinder consists of at least one axially parallel or coaxial central channel and at least one axially parallel row of radial feed holes which lead from the central channel to the surface of the feed cylinder.

In another preferred embodiment, the feed cylinder is rotatably adjustable and comprises a plurality of feed systems comprising rows of feed holes. The feed systems can be adjusted to the circumferential position of the application gap if desired. Thus, the length of the rows of feed holes of the individual feed systems can differ amongst one another. Other configurations of the sizes and shapes of the feed holes could be used in other embodiments. In one embodiment, varying the application pattern on the label material, including adapting the application of adhesive to labels of different width by adjusting the feed cylinder, can be achieved without dismantling the rotary application head. In this embodiment, the feed cylinder is preferably provided with a number of feed systems distributed uniformly over the circumference. A servomotor can make adjustments by the respective angular pitch between the feed systems, for example, controlled by means of a belt drive.

Another embodiment comprises elastically supported closure strips provided in the feed cylinder on both sides of a row of feed holes. This prevents adhesive medium emerging from the feed systems inside the mask cylinder from flowing off to the sides. Accordingly, the supplied adhesive medium is only used to expel and replace adhesive medium that is already stored in the individual outlet openings.

According to a further aspect, it is proposed that provided in the housing and/or in the feed cylinder are wiper devices running parallel to the application gap. The wiper devices act on the rotating mask cylinder before the outlet into the application gap. The effect of these wiper devices is that the mask cylinder enters into the application gap free from adhesive, particularly on the outer side, thereby reducing the uptake of dirt because the adhesive medium contained in the openings immediately reaches the label material.

Another embodiment includes a central channel connected to an exterior annular groove via a plurality of radial holes and the annular groove is connected to a housing hole that is supplied with liquid adhesive. The mask cylinder can then be shaped depending on whether the labels are to be glued (provided with adhesive) transverse to their rolling-up direction, longitudinally to their rolling-up direction, or linearly along their circumferential edges. In addition, a plurality of outlet openings, distributed non-uniformly over the circumference is constructed on the mask cylinder. In particular two axially parallel rows of outlet openings are used. Alternatively, at least two rings of outlet openings extend over the circumference of the mask cylinder or lines of outlet openings that form a closed curve when unwound are provided in the mask cylinder.

Another aspect of the invention is a labelling installation for applying labels to cylindrical bodies, such as bottles. The labelling installation includes an unrolling device for label strip material, a rotating drivable vacuum drum for supplying label strip material or individual labels, a cutting device for separating individual labels from label strip material, and a rotating application head for liquid adhesive, such as hot melt adhesive. The rotating application head cooperates with the vacuum drum. The labelling installation also includes a carousel for passing the cylindrical body past the vacuum drum with rotating means for the cylindrical bodies. The rotating means bring about a rolling of said bodies on the vacuum drum. The labelling installation also includes a means for charging and discharging the cylindrical bodies onto and from the carousel. The axes of the vacuum drum, rotary application head and carousel are arranged parallel to one another. The rotary application head comprises a housing with a cylindrical chamber that passes through the housing in an axially parallel application gap. In addition, arranged coaxially in the cylindrical chamber is a vertical feed cylinder having a cylindrical chamber forming a cylindrical annular space interrupted by the application gap. The vertical feed cylinder includes at least one feed channel system running parallel to the application gap. Moreover, arranged rotatably drivably in the cylindrical annular space is a mask cylinder with outlet openings which exposes in a controlled fashion the feed channel system in the feed cylinder by means of the outlet openings towards the application gap during rotation. Also, the rotary drives of the vacuum drum and the mask cylinder are mechanically coupled, such as via gearing. In addition, the drives of the vacuum drum and the carousel can be mechanically coupled using rotational means, such as gearing.

Preferred exemplary embodiments of the invention are shown in the drawings and are described hereinafter.

DETAILED DESCRIPTION OF THE ILLUSTRATED EMBODIMENTS

Figure 1A:
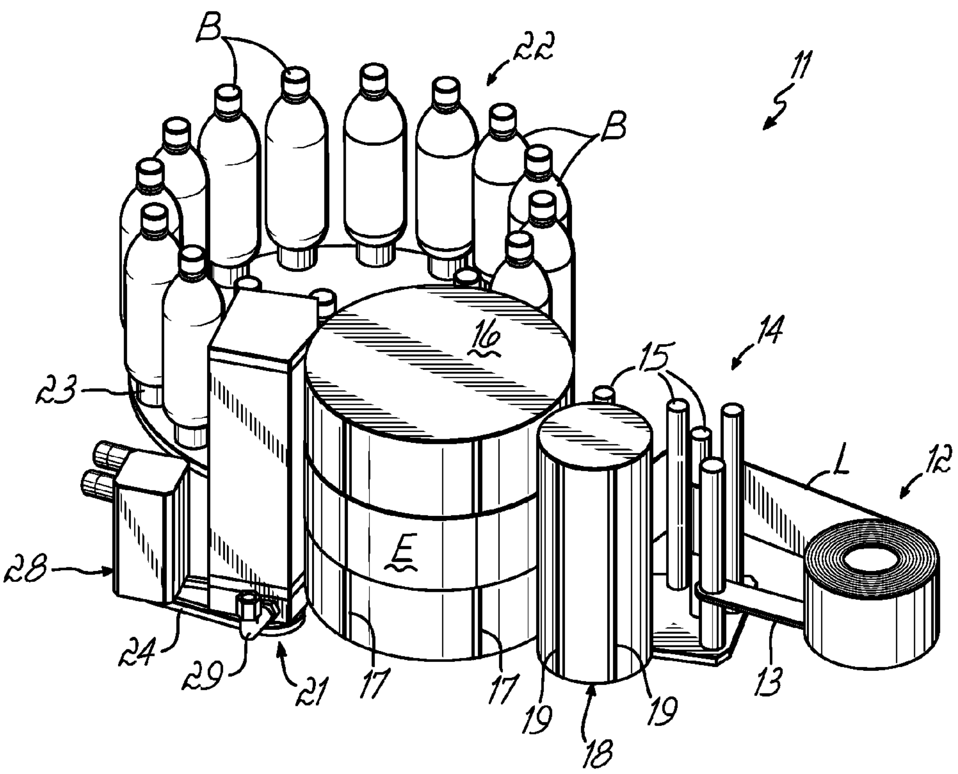
FIG. 1A illustrates a 3D representation of one embodiment of a labelling installation according to the invention.
Figure 1B:
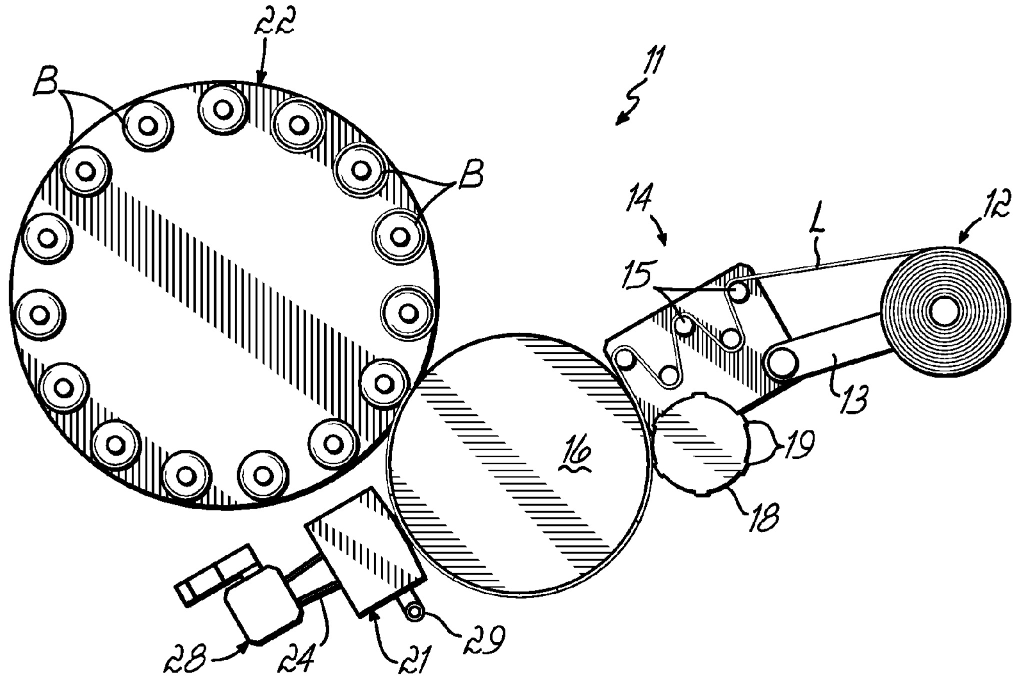
FIG. 1B illustrates a plan view of one embodiment of labelling installation according to the invention.
Figure 1C:
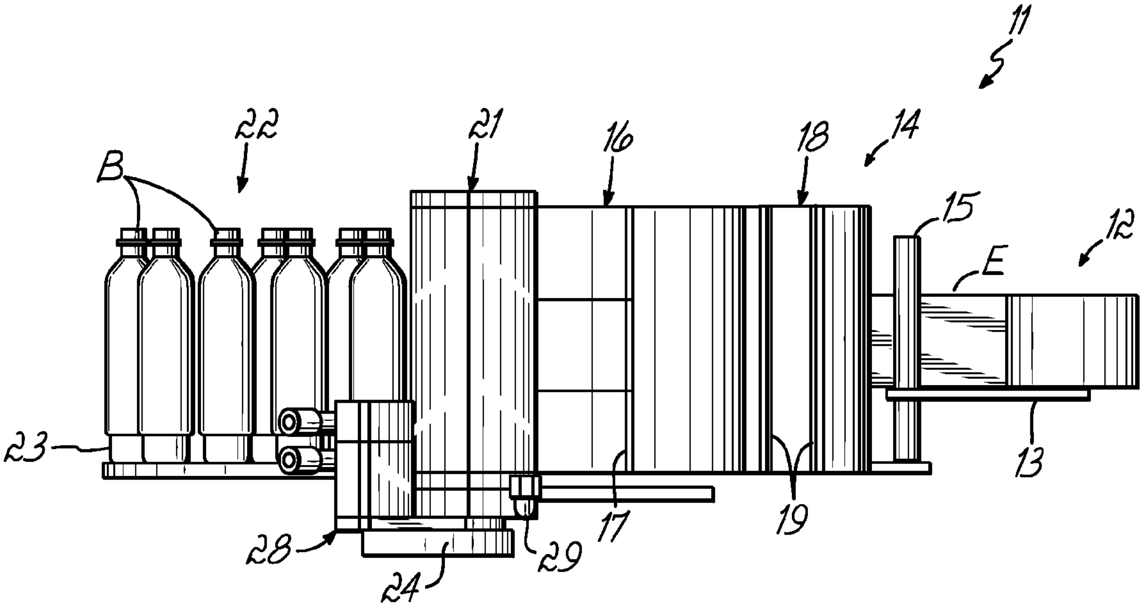
FIG. 1C illustrates a first side view of one embodiment of a labelling installation according to the invention.
Figure 1D:
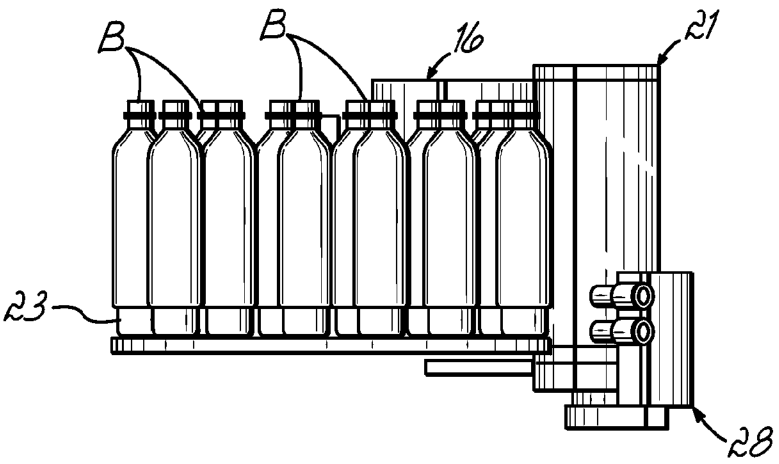
FIG. 1D illustrates a second side view of one embodiment of a labelling installation according to the invention.

FIGS. 1A-D are subsequently described. A bottle labelling plant 1 1 according to the invention includes as substantial components an unrolling device 12 for label strip material L and a strip travel regulating arrangement 14 which can regulate the height position of the strip material L. The unrolling device 12 is supported by a roll retaining arm 13. The strip travel regulating arrangement 14 comprises individual deflecting rollers 15. The bottle labelling plant 11 further comprises a vacuum drum 16 on which individual axially parallel cutting edges 17, distributed on the circumference, can be seen. The vacuum drum 16 also has underpressure openings not shown in detail on its circumferential surface, which hold the strip material L or individual labels firmly on the vacuum drum 16. A cutting device 18 with a movable cutting blade 19 cooperates with the cutting edges 17 of the vacuum drum 16. By means of this cutting device 18 individual labels are separated from the strip material L and specifically in the position of the cutting edges 17 in each case.

Also shown in cooperation with the vacuum drum 16 is a rotary application head 21 which will be explained in detail later. Finally, associated with the vacuum drum 16 is a bottle carousel 22 on which are arranged individual rotationally drivable bottle carriers 23 on which cylindrical bottles B stand. The rotary movement of the bottle carousel 22 and the individual bottle carriers 23 is synchronised with respect to the vacuum drum 16 so that a rolling movement takes place between the individual bottles B and the vacuum drum 16 so that the individual labels L provided with adhesive on the rotary application head 21 can lie on the bottles B free from tensile force and adhere fixedly thereto. The vacuum drum 16 rotates clockwise and the bottle carousel 22 and the bottle carriers 23 therefore each tend to rotate counter-clockwise. A servomotor 28 connected to the rotary application head 21 via a belt drive 24 can be used in some embodiments.

Figure 2:
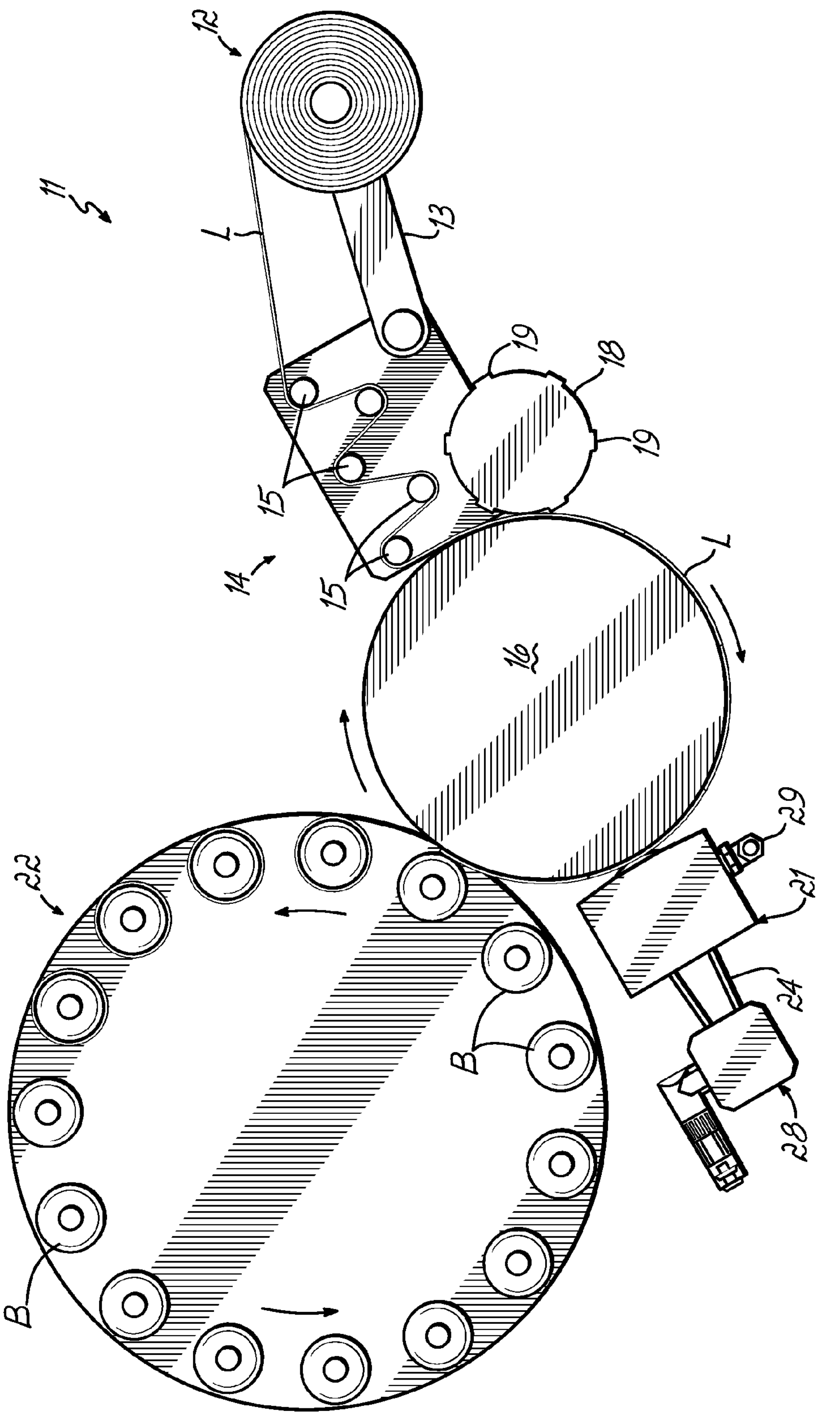
FIG. 2 illustrates the labelling installation from FIG. 1A in an enlarged plan view.

In FIG. 2 the same details as in FIG. 1 are provided with the same reference numbers. In this respect, reference is made to the preceding description. FIG. 2 is an enlarged view of FIG. 1A. As a result of the strip material L shown with exaggerated thickness it is clear that the vacuum drum 16 is rotatably driven clockwise whereas the bottle carriers 23 on the carousel 22 must be driven counter-clockwise so that a single label L is wound onto a bottle B in each case. The carousel 22 itself is also driven counter-clockwise.

Figure 3:
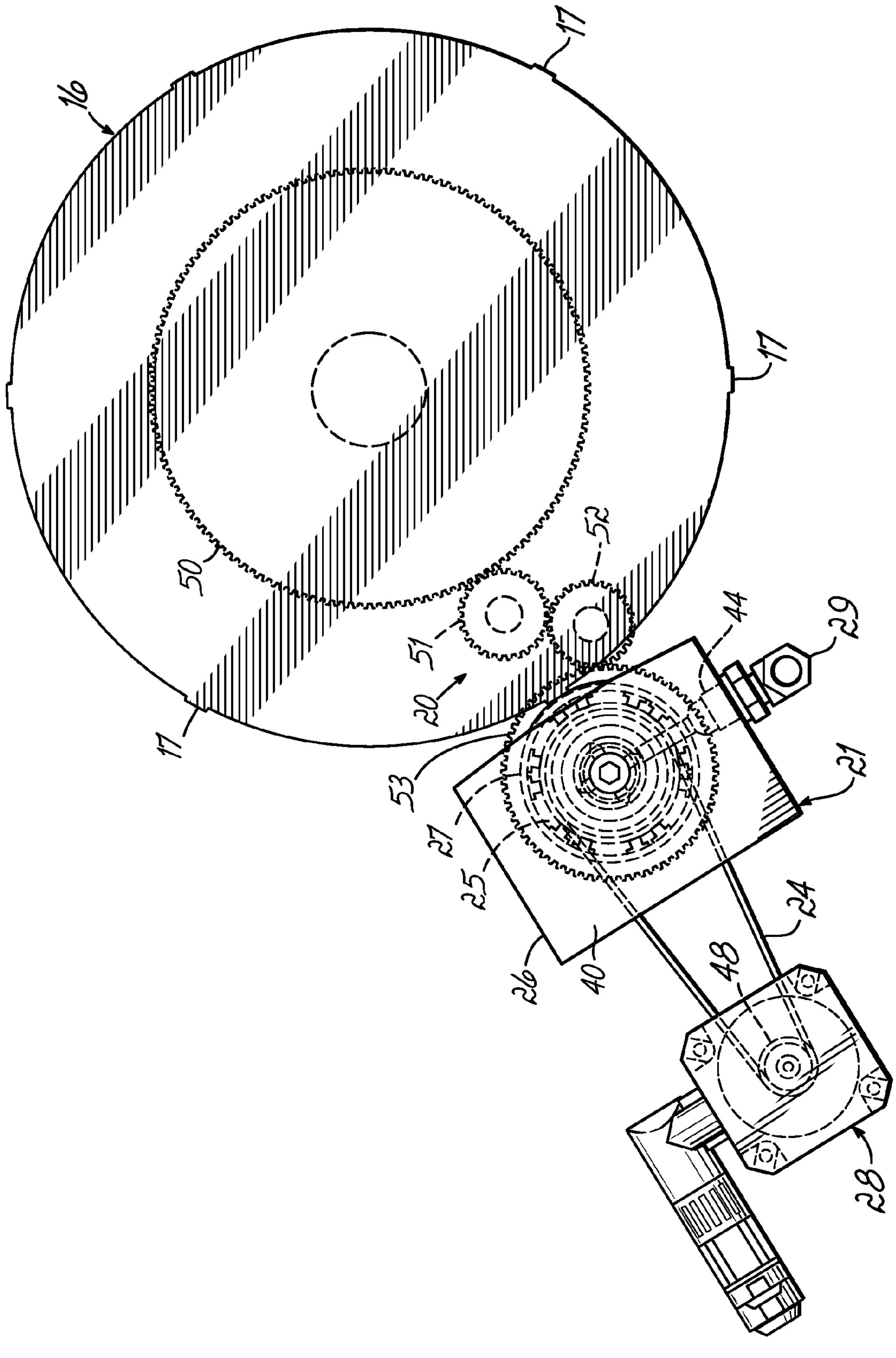
FIG. 3 illustrates a vacuum drum and a rotary application head of the labelling installation from FIG. 2 in enlarged view.

FIG. 3 shows the vacuum drum 16, the rotary application head 21 and the servomotor 28 in the same way as in FIG. 2 and the same details have the same reference numbers. As can be seen by implication, the servomotor 28 can rotatably adjust by means of the belt drive 24 a central feed cylinder 25 in the housing 26 of the rotary application head 21. Furthermore, a toothed gearing assembly or drive train 20 can also be seen, which couples a mask cylinder 27 in the housing 26 that surrounds the feed cylinder 25, to the vacuum drum 16 such that the mask cylinder 27 and vacuum drum 16 with labels L lying thereon roll on one another.

Reference is made to the preceding description. A toothed gearing 20 is composed in detail of a gear wheel 50 connected to the vacuum cylinder 16, two intermediate wheels 51, 52 and a gear wheel 53 connected to the mask cylinder 27. Accordingly, the vacuum drum 16 and the mask cylinder 27 rotate relative to each other and therefore pass the label material L therebetween to apply liquid adhesive from the mask cylinder 27 onto each label L. Positioned on the housing 26 of the rotary application head 21 is an inlet 29 for liquid adhesive.

Figure 4B:
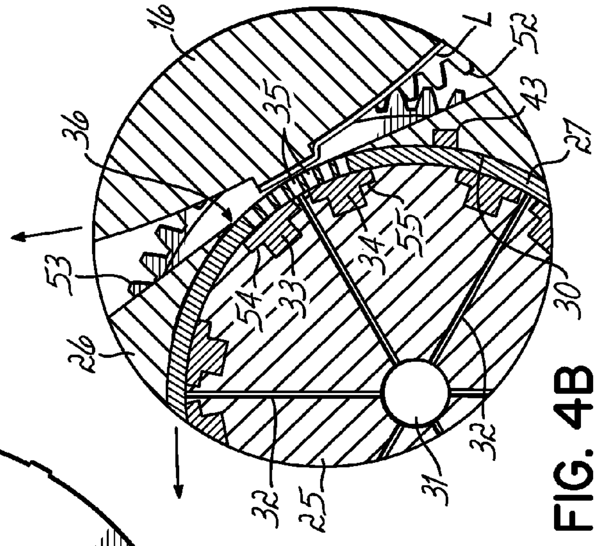
FIG. 4B illustrates an enlarged view of the circle labelled 4B from FIG. 4A.
Figure 4A:
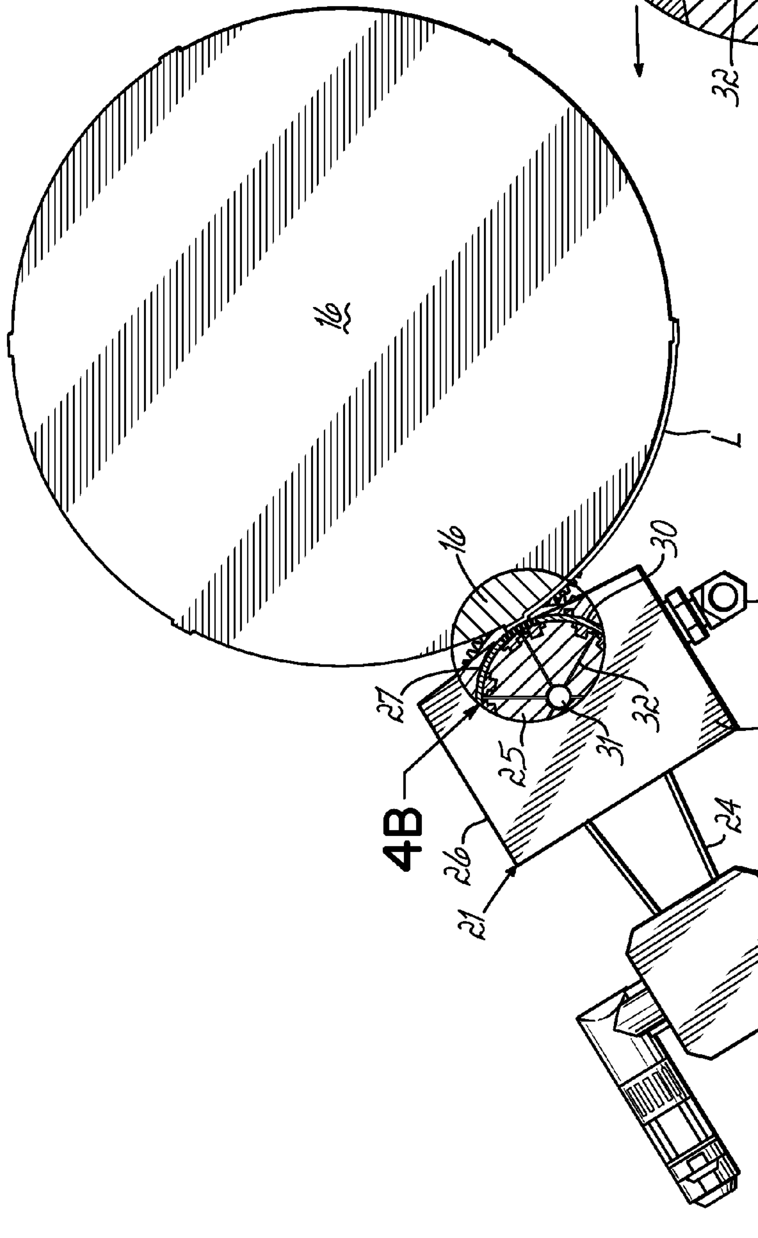
FIG. 4A illustrates the vacuum drum and rotary application head of FIG. 3 from a top plan view partially in cross section in a circle labelled 4B.

In FIGS. 4A and 4B the same details as in FIG. 3 are provided with the same reference numbers. In the enlarged detail illustrated in FIG. 4B, it is possible to identify the housing 26 with a cylindrical chamber 30, with the feed cylinder 25 for supplying adhesive arranged concentrically in the cylindrical chamber 30. The feed cylinder 25 has a central channel 31 and six feed channel systems 32 distributed over the circumference that extend as far as the surface of the feed cylinder 25. In each case, on both sides of the outlet of a feed channel system 32 it is possible to identify two closure strips 33, 34 which are elastically supported in the feed cylinder 25.

Located in an annular cylindrical space formed by the cylindrical chamber 30 with the feed cylinder 25 is the mask cylinder 27. The vacuum cylinder 16 rolls with the same circumferential speed in a clockwise fashion compared with the counterclockwise mask cylinder 27. The label material L rests on the vacuum cylinder 16 and liquid adhesive reaches the label material L via outlet openings 35 in the mask cylinder 27. Since the vacuum drum 16 and mask cylinder 27 travel past one another at the same speed, a precise rectangular application of adhesive is made onto the label material L which does not smear on the outside of the mask cylinder 27.

Figure 5A:
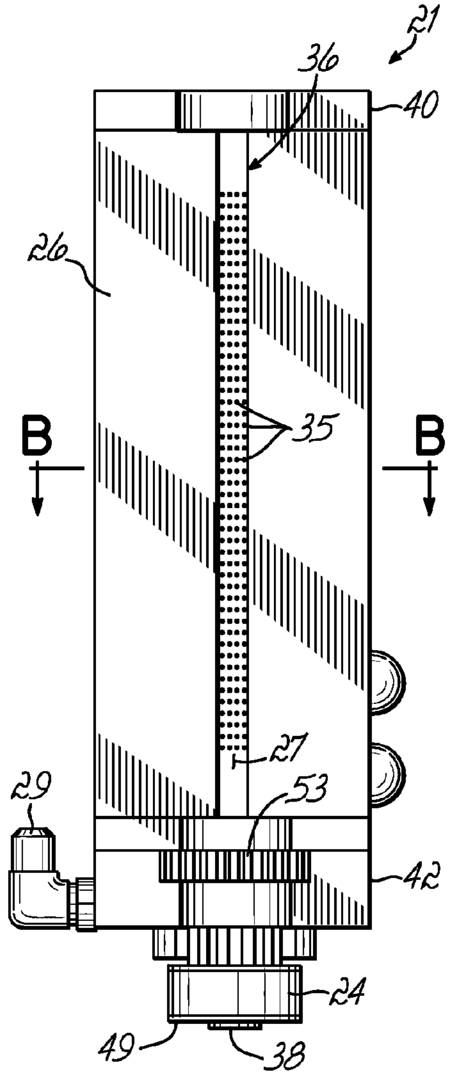
FIG. 5A illustrates a side view of one embodiment of a rotary application head according to the invention.
Figure 5B:
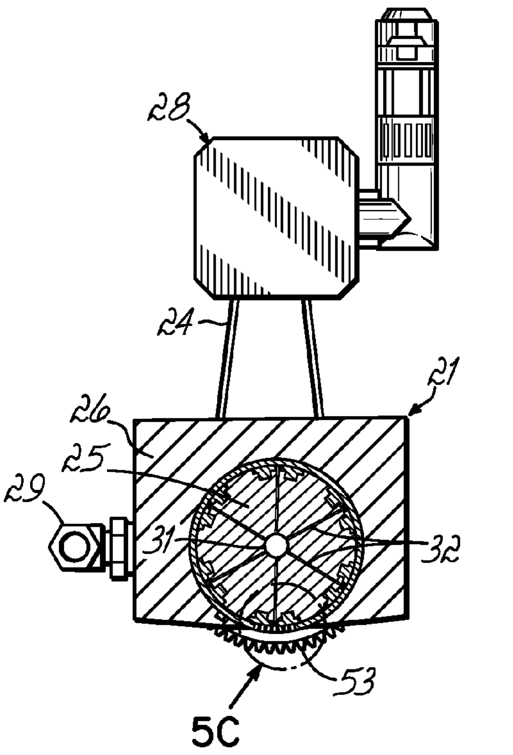
FIG. 5B illustrates a cross-sectional view of one embodiment of a rotary application head according to the invention.
Figure 5C:
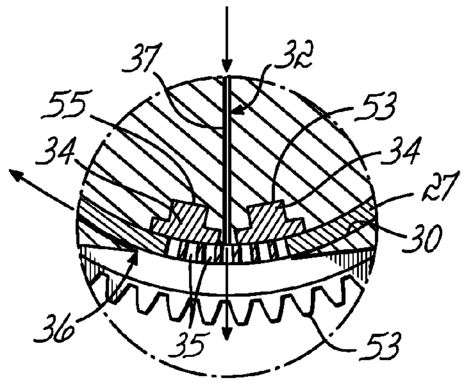
FIG. 5C illustrates an enlarged view of the cross-section of FIG. 5B.

FIGS. 5A-C are subsequently described. The rotary application head 21 is shown here for the first time, viewed onto the outlet gap 36 in the housing 26. The outlet openings 35 in the mask cylinder 27 can be distributed over the circumference or can form a row extending in the axial direction. The cross-section illustrates, only one of the six feed channel systems 32 of the fundamentally vertical feed cylinder 25, distributed over the circumference. The feed channel system 32 is active, i.e. liquid adhesive only flows out of the feed system and is downwardly directed in the cross-section whereas the other systems shown are inactive. The servomotor 28 has a belt drive 24 that drives the feed cylinder 25 enabling adjustment between the individual feed systems which can be constructed differently.

Figure 6B:
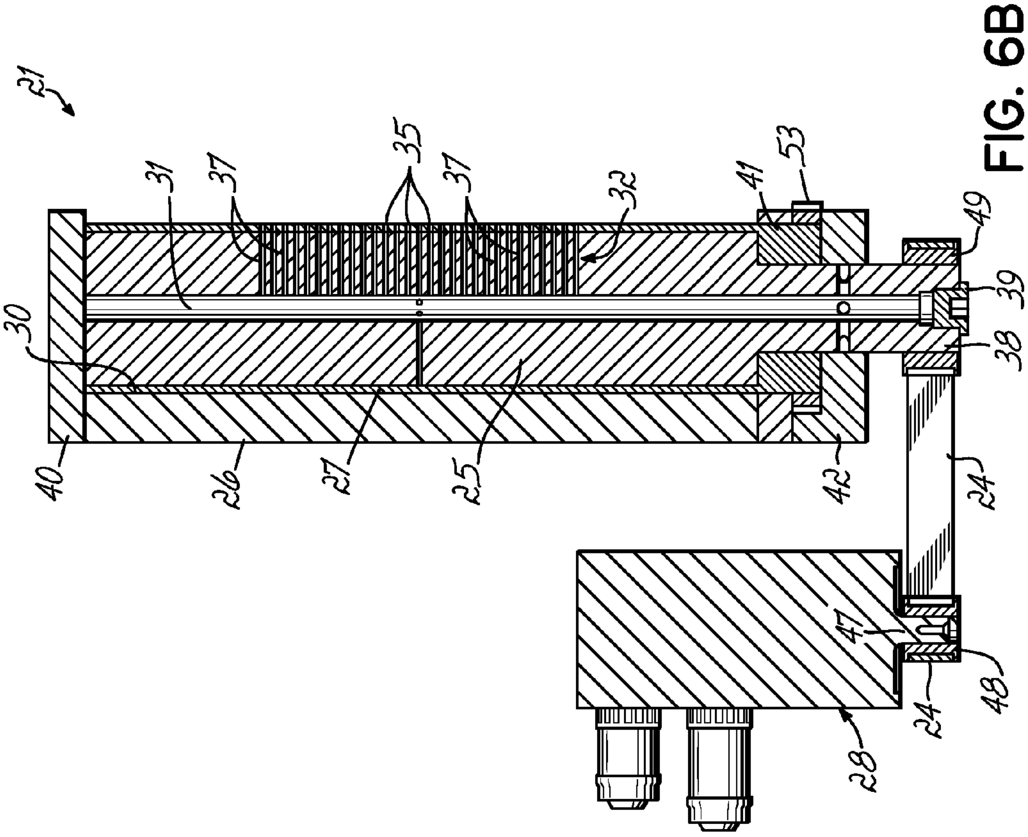
FIG. 6B illustrates a longitudinal sectional view through the axis of the rotary application head through sectional lines 6B-6B in FIG. 6A.
Figure 6A:
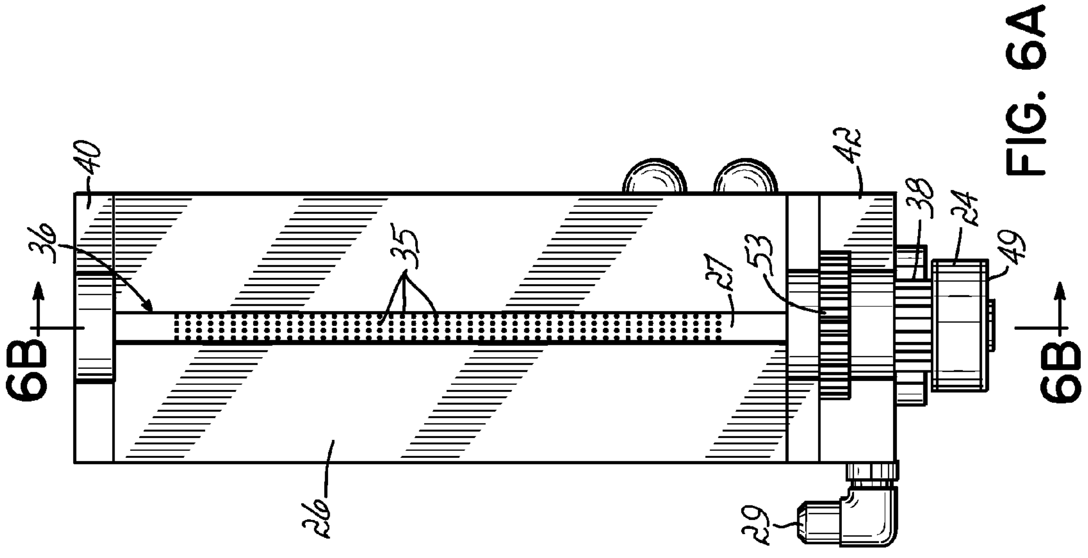
FIG. 6A illustrates a side view of the rotary application head according to the embodiment of the invention from FIGS. 5A-C.

FIGS. 6A-6B are subsequently described. Whereas the outlet openings 35 in the mask cylinder 27 extend almost over the total height of the outlet gap 36, the feed channel system 32 here turned towards the outlet gap 36 is formed from a substantially shorter row of radial holes 37 which connect the central channel 31 to the surface of the vertical feed cylinder 25.

Therefore, depending on the design of the perforation pattern in the mask cylinder 27, an efficient outflow of adhesive only takes place over the axial length of the selected feed system 32. The six feed systems 32 distributed over the circumference, which have already been identified, differ from one another in respect of the longitudinal extension of the row of holes 37 in the axial direction. Therefore, by adjusting the feed cylinders by means of the servomotor 28 without exchanging the mask cylinder 27, different adhesive application patterns can be produced which differ in particular in the axial longitudinal extension or in the active height. Changing the active feed system 32 changes the width of the label material. The servomotor 28 acts directly on a lower axle 38 of the feed cylinder via the belt drive 24. This belt drive 24 comprises a pulley 48 mounted on a shaft pin 47 of the servomotor 28 and a spline 49 mounted on the axle 38 of the feed cylinder 25. The central channel 31, which passes through the entire feed cylinder 25, is closed at the bottom by a locking screw 39. An upper cover 40 against which the feed cylinder 25 and the mask cylinder 27 directly abut delimits the housing 26. The mask cylinder 27 has a cylindrical collar 41 at the lower end on which the gear wheel 53 is pressed for speed coupling with the vacuum cylinder 16. At the bottom the housing is closed by a second cover 42.

Figure 7A:
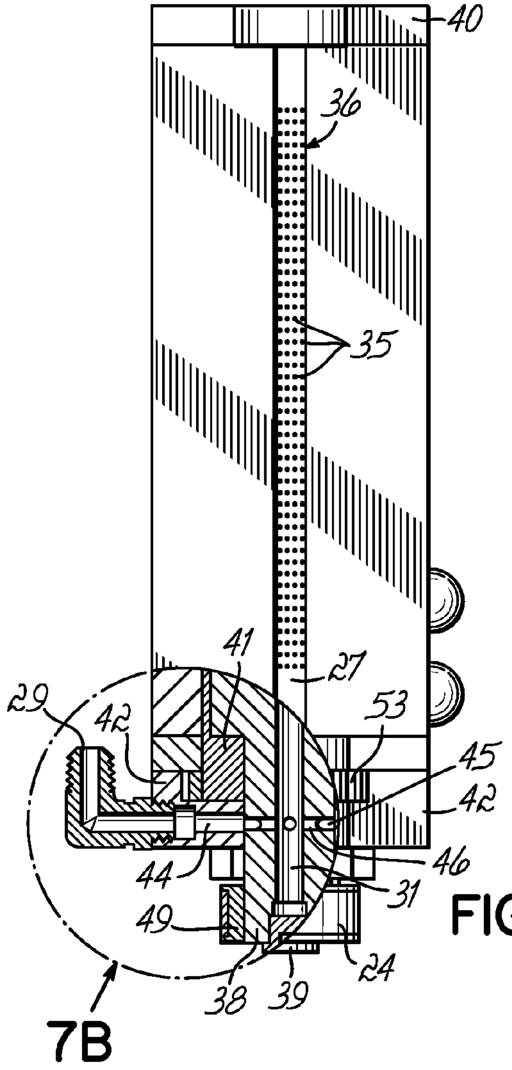
FIG. 7A illustrates a side view partially in cross-section of the rotary application head according to the embodiment of the invention from FIGS. 5A-5C.
Figure 7B:
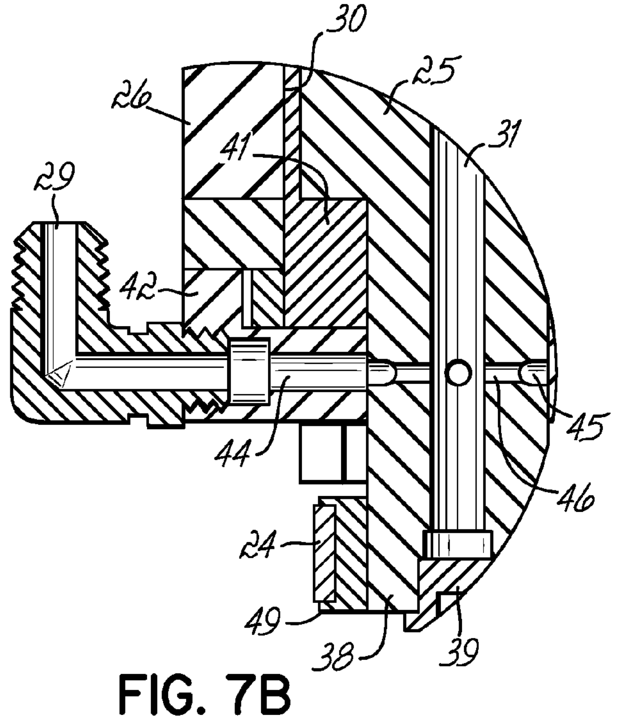
FIG. 7B illustrates an enlarged view of circle 7B of FIG. 7A of the rotary application head according to the embodiment of the invention from FIGS. 5A-C.

FIGS. 7A-B are subsequently described. On the rotary application head 21 it is possible to see the inlet 29 screwed into the cover 42, which is in communication with a radial hole 44 in the cover 42. At the axle 38 of the feed cylinder 25 there is formed a circumferential groove 45 which is associated with the hole 44 for supplying liquid adhesive from the connecting piece.

From the circumferential groove 44 the adhesive passes via a plurality of circumferentially distributed radial holes 46 into the central channel 31. The locking screw 39 in the central channel 31 also helps to keep the mask cylinder 25 together.

Figure 8A:
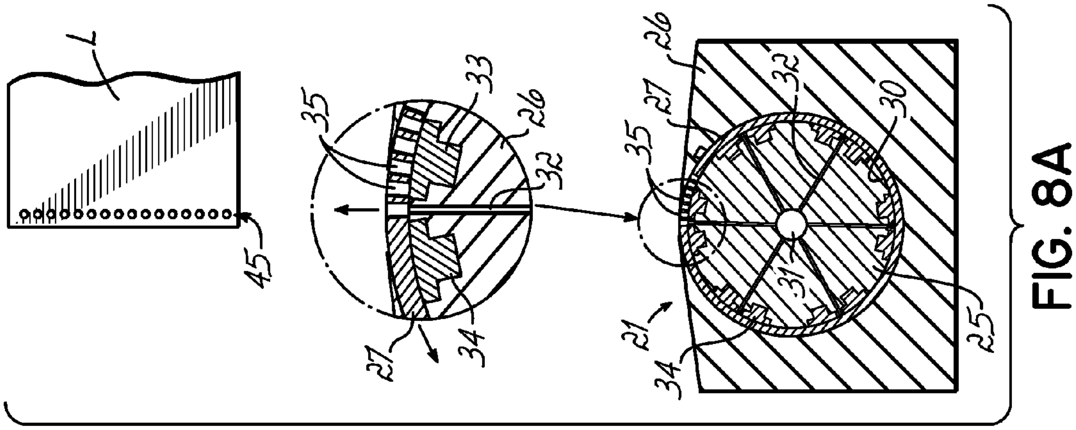
FIG. 8A illustrates a schematic depicting cross-sections of the mask cylinder in a first position and the resultant effect on the adhesive applied to label L.
Figure 8B:
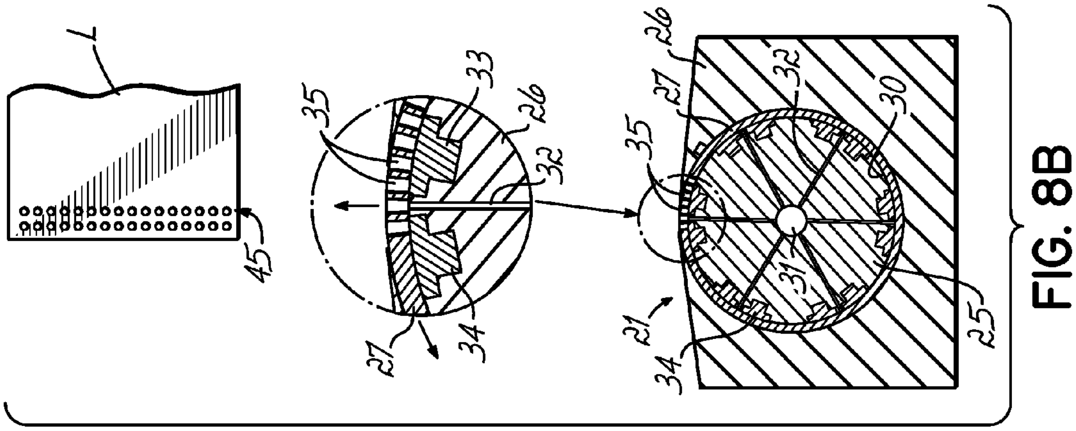
FIG. 8B illustrates a schematic depicting cross-sections of the mask cylinder in a second position and the resultant effect on the adhesive applied to label L.
Figure 8C:
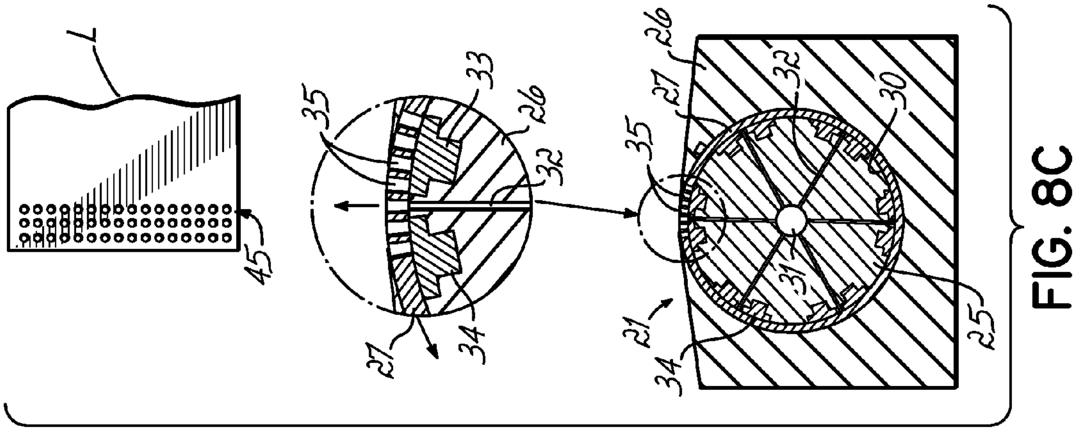
FIG. 8C illustrates a schematic depicting cross-sections of the mask cylinder in a third position and the resultant effect on the adhesive applied to label L.

FIGS. 8A-C are subsequently described. The rotary application head 21 is shown in cross-section, and reference should be made to the cooperation between the feed cylinder 25, especially the active feed system 32 and the mask cylinder 27 which is driven in a counter-clockwise fashion and shown in three different positions from left to right. In FIG. 8A, a first row of outlet openings 35 is associated with the feed system 32 so that a first row of adhesive application points 45 is formed on the label L, shown at the top, which is passing by with the vacuum cylinder. In FIG. 8B the mask cylinder 27 and label L are moved further to the left wherein a second row of outlet openings 35 is associated with the feed system 32 to form a second row of adhesive application points 45 on the label L. FIG. 8C illustrates that both the mask cylinder 27 and the label L are rotated further to place a third row of outlet openings 35 into communication with the feed system 32 forming a third row of adhesive application points 45 on the label L. As can be seen, the mask cylinder 27 has seven rows of outlet openings 35 in total ultimately forming a strip of seven rows of adhesive application points 45 on the label L.

Figure 9A:
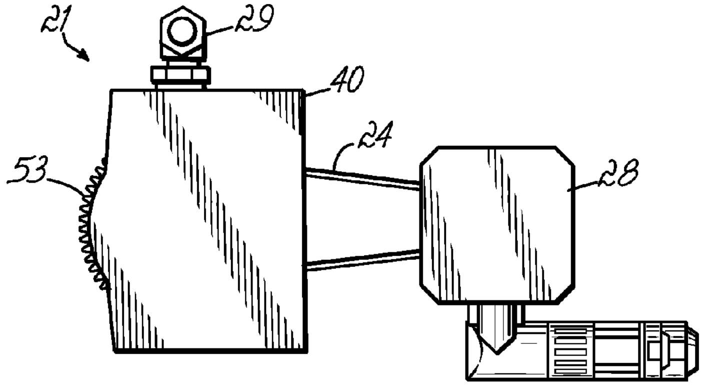
FIG. 9A illustrates a plan view of the rotary application head according to the embodiment of the invention from FIGS. 5A-C.
Figure 9B:
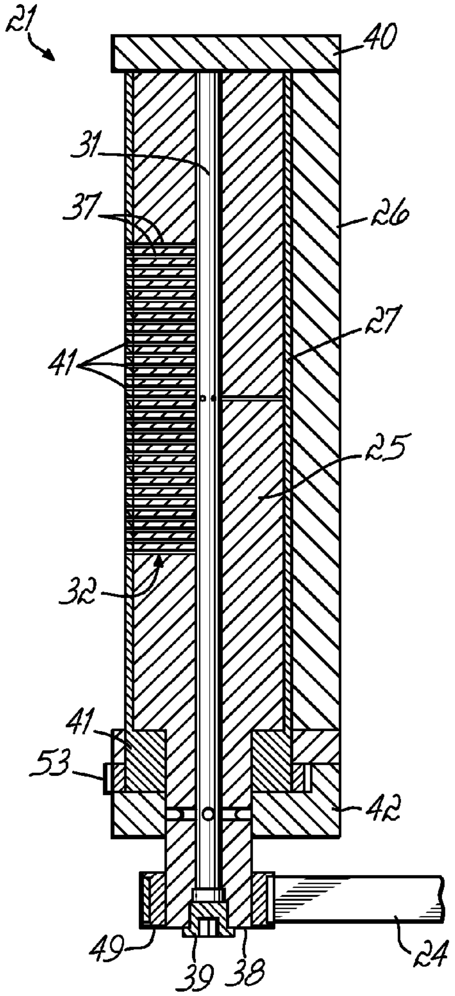
FIG. 9B illustrates an axial longitudinal section of the rotary application head according to the embodiment of the invention from FIGS. 5A-C.
Figure 9C:
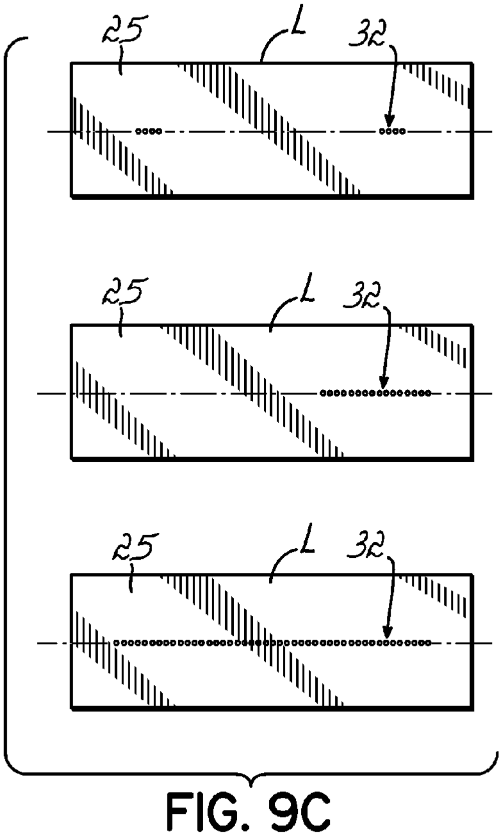
FIG. 9C illustrates a partial view in three variants of the rotary application head according to the embodiment of the invention from FIGS. 5A-C.

FIGS. 9A-C are subsequently described. The rotary application head 21 is shown in plan view and in an axial longitudinal section. Therefore, details can be seen in the longitudinal section that approximately corresponds to the details in FIG. 6B. Reference is made to the description there. The servomotor 28 is not shown in FIG. 9B. In addition, FIG. 9C illustrates three views of the feed cylinder 25 viewed in the direction of the outlet gap (not shown). Further feed systems 32 shown in cross-section from FIG. 9B have a different longitudinal distribution of the outlet holes 35 so that by adjusting the feed cylinder 25 other application widths or application heights of the adhesive can be produced. FIG. 9C illustrates how these application widths or heights can approximately comprise the total lengths of the outlet gap (bottom), only partial areas of the outlet gap (centre) or individual regions of the outlet gap spaced apart from one another (top). FIG. 9C also illustrates the direct view of the feed cylinder 25 with the feed systems 32.

Figure 10A:
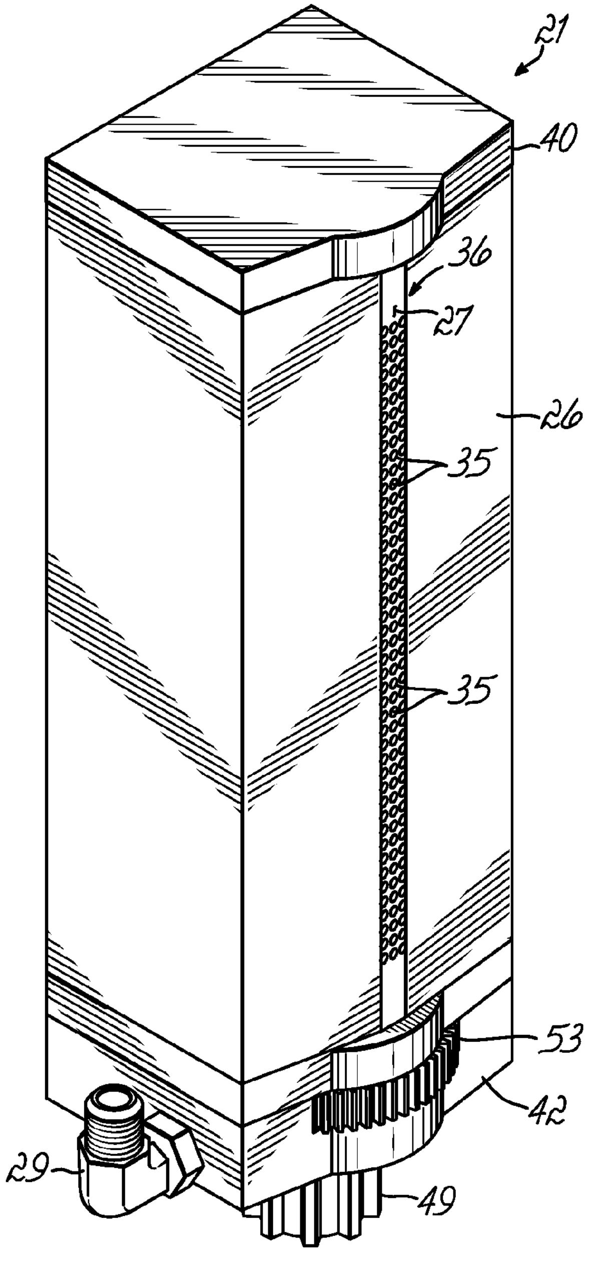
FIG. 10A illustrates the rotary application head according to one embodiment of the invention and details in 3D representation, and specifically viewed onto the housing.
Figure 10B:
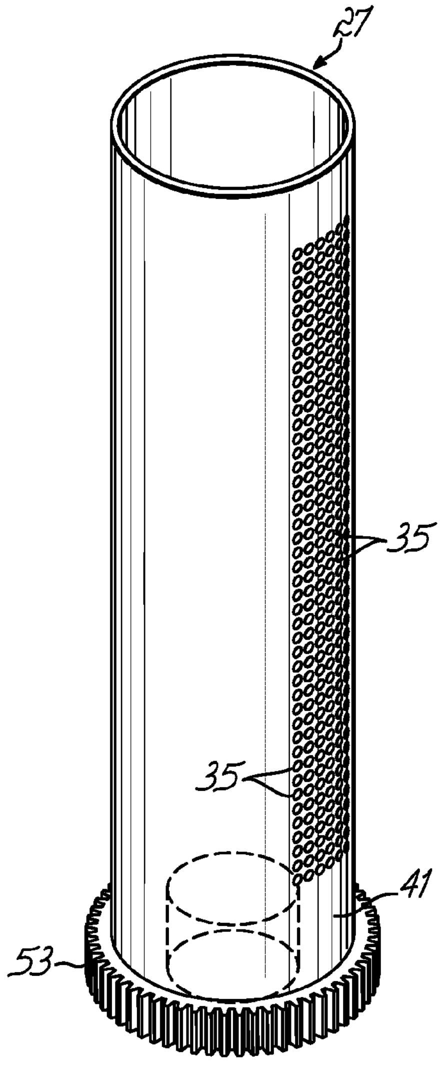
FIG. 10B illustrates the rotary application head according to one embodiment of the invention and details in 3D representation, and specifically the mask cylinder in detail.
Figure 10C:
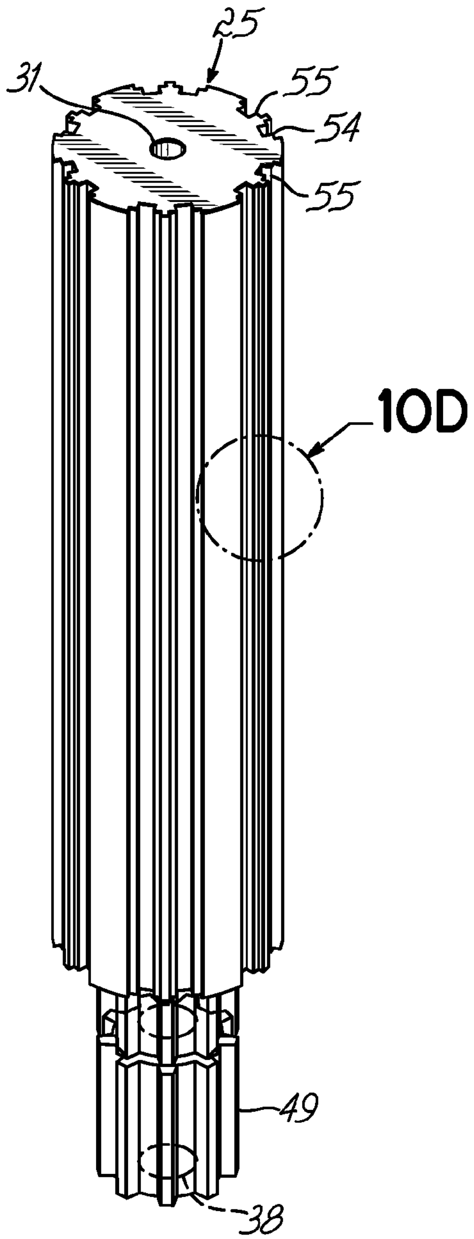
FIG. 10C illustrates the rotary application head according to one embodiment of the invention and details in 3D representation, and specifically viewed in the feed cylinder in detail.
Figure 10D:
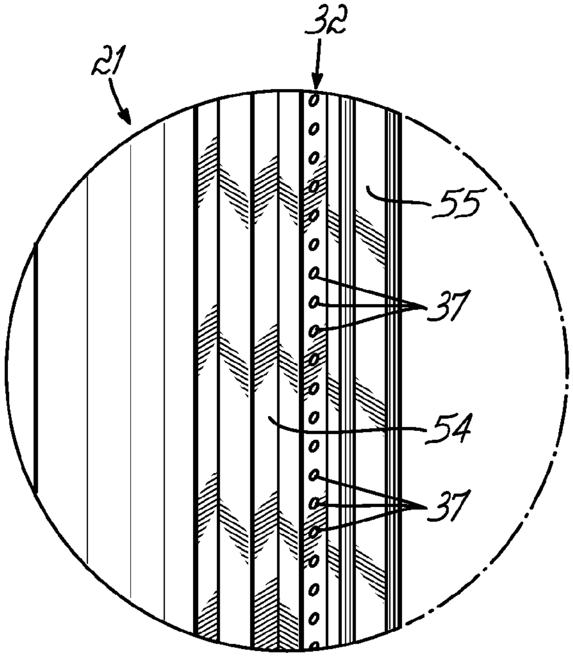
FIG. 10D illustrates an enlarged view of the circle 10D of FIG.

FIG. 10A illustrates the rotary application head 21 with details as described previously. The covers 40, 42 of the housing 26 bridge the outlet gap 36 and therefore give the housing necessary rigidity. FIG. 10B illustrates the mask cylinder 27 with a group of outlet openings 35 that are arranged substantially as axially parallel strips of several rows. The collar 41 and the drawn-up gear wheel 53 are also illustrated. FIG. 10C illustrates the feed cylinder 25 with the axle 38 and the spline 49. FIG. 10D illustrates the regions comprising the feed systems 32 having the outlet holes 37 and adjacent grooves 54, 55. The adjacent grooves 54, 55 receive the closure strips 33, 34 (not shown).

Figure 11B:
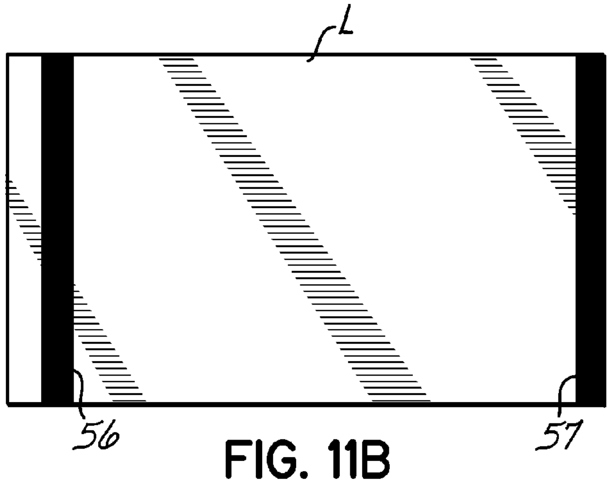
FIG. 11B illustrates a glued label with strip-shaped area application.
Figure 11A:
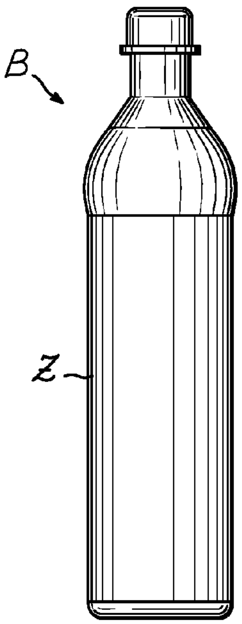
FIG. 11A illustrates one type of object that can be labelled using the invention, namely a partly cylindrical bottle.
Figure 11C:
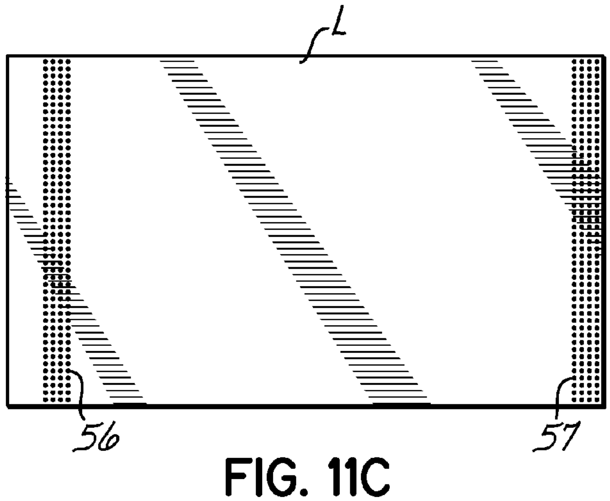
FIG. 11C illustrates a glued label with strip-shaped point application.
Figure 11D:
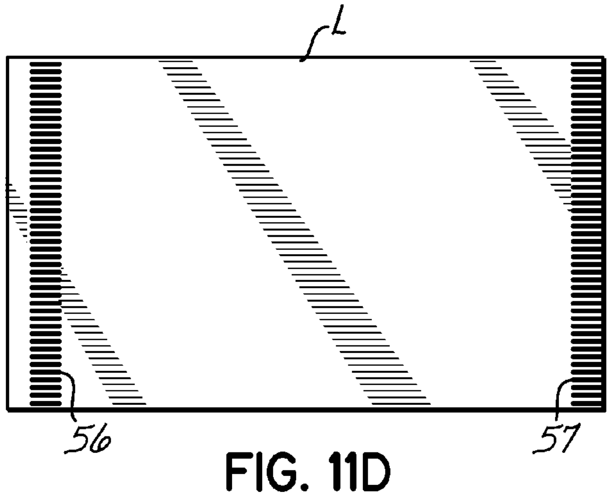
FIG. 11D illustrates a glued label with strip-shaped line application.

FIG. 11A illustrates a bottle B which necessarily has a cylindrical region Z to receive a label L. FIGS. 11B, C, and D each show a label L glued with adhesive which is provided for overlapping adhesion. In each case, the label begins winding onto the bottle from the left edge and concludes on the right edge. The dark portions 56, 57 of the surface in this case correspond to the application of adhesive. The label L can then be understood at the same time as unwinding from the mask cylinder 27. FIG. 11B illustrates that the mask cylinder 27 must have external longitudinal grooves into which a plurality of outlet openings discharge. FIGS. 11C and 11D illustrate that the corresponding mask cylinder 27 has a single hole or circumferential slit extending as far as the surface.

Figure 12A:
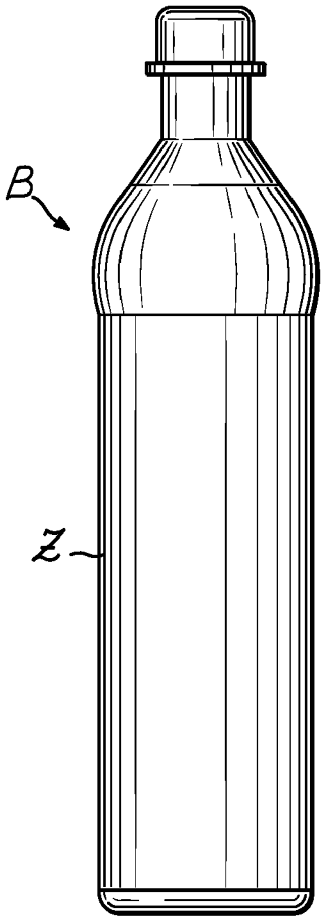
FIG. 12A illustrates one type of object that can be labelled using the invention, namely a partly cylindrical bottle.
Figure 12B:
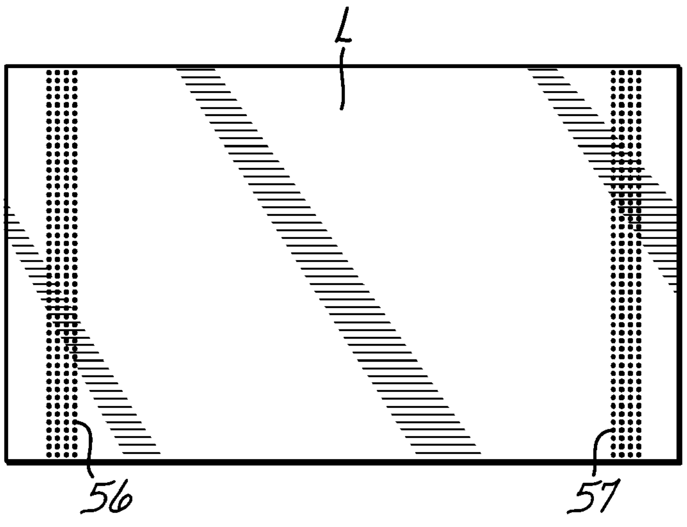
FIG. 12B illustrates a glued label with point application in a transverse strip arrangement.

FIG. 12A, illustrates a bottle B with a cylindrical section Z to receive a label. FIG. 12B illustrates a label L provided with adhesive that substantially corresponds to that shown in FIG. 11C. The distribution of adhesive points differs slightly from FIG. 11. A first adhesive strip 56 running transverse to the direction of travel at a distance from a transverse edge and a second adhesive strip 57 abutting against the opposite end edge can be seen here. As already mentioned, an overlapping application of the label on the bottle is intended.

Figure 13A:
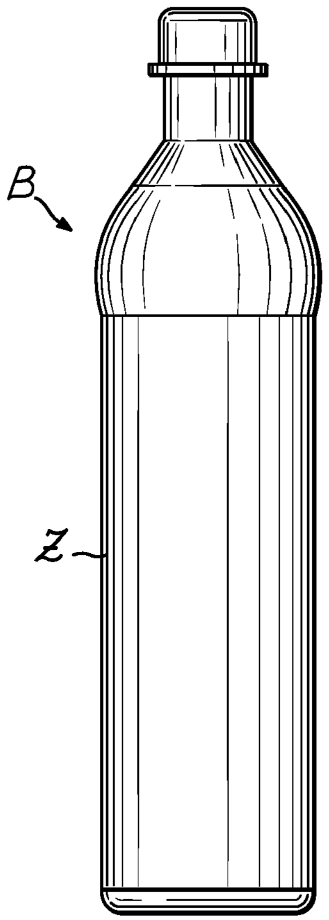
FIG. 13A illustrates one type of object that can be labelled using the invention, namely a partly cylindrical bottle.
Figure 13B:
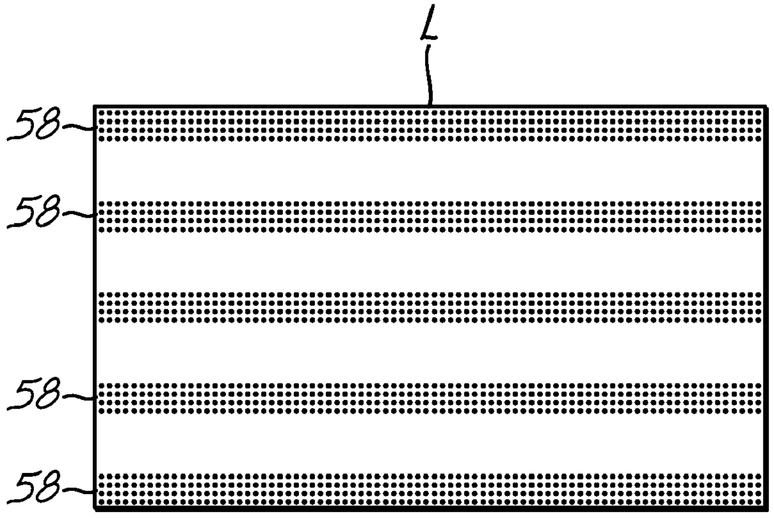
FIG. 13B illustrates a glued label with point application in a longitudinal strip arrangement.

FIG. 13A illustrates a bottle B with a cylindrical section Z. FIG. 13B illustrates a label provided with adhesive that is intended for non-overlapping application to the cylindrical body Z of the bottle B. Individual adhesive strips 58 running in the transport direction or winding-on direction having two outer strips running along the edges.

The adhesive application pattern can be seen as unwinding the mask cylinder 27 which in this case must have rows of perforations extending over the entire circumference or groups of rows of perforations.

Figure 14A:
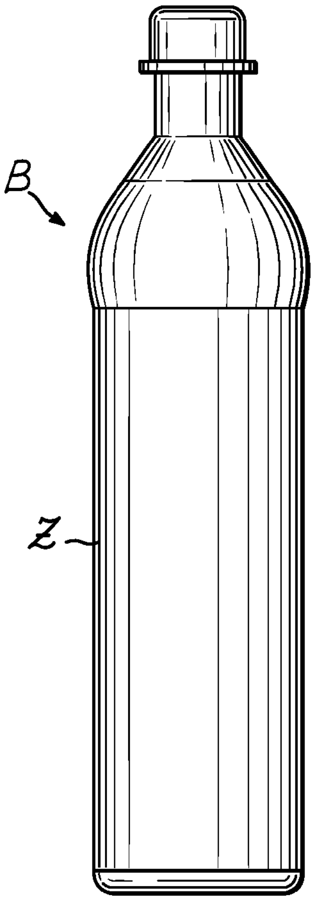
FIG. 14A illustrates one type of object that can be labelled using the invention, namely a partly cylindrical bottle.
Figure 14B:
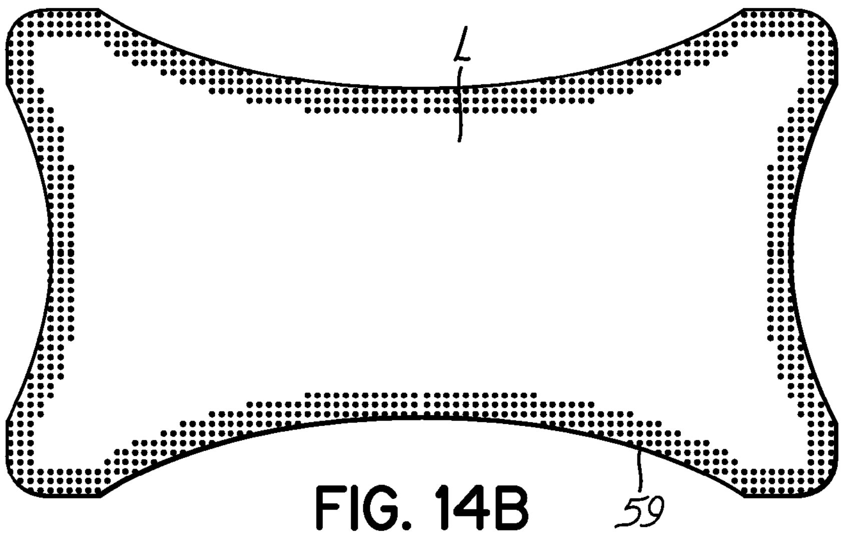
FIG. 14B illustrates a glued label with point application in a line embodiment in a first embodiment.

FIG. 14A illustrates a bottle B with a cylindrical section Z. FIG. 14B illustrates a label L that has an approximately frame-shaped application of adhesive. The frame consists of a line 59 composed of individual points running along the circumferential edge of the label L. The label L accordingly has a banner shape.

Figure 15A:
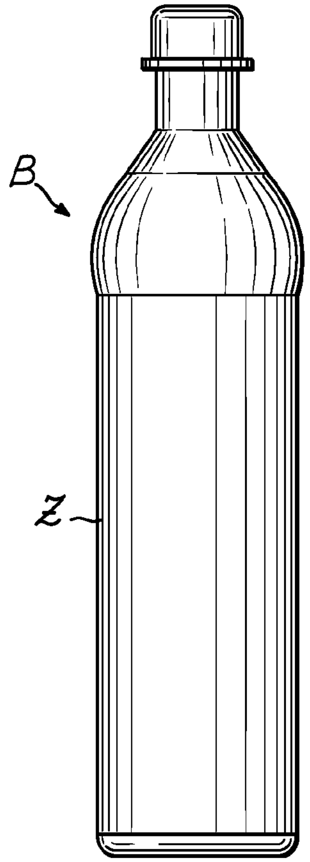
FIG. 15A illustrates one type of object that can be labelled using the invention, a partly cylindrical bottle.
Figure 15B:
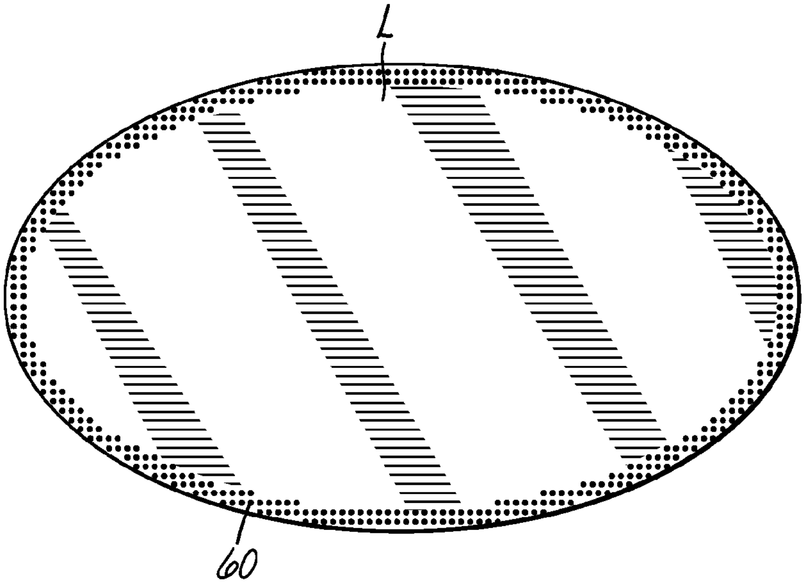
FIG. 15B illustrates a glued label with point application in a line embodiment in a second embodiment.

FIG. 15A illustrates a bottle B with a cylindrical section Z. FIG. 15B illustrates a label L which has an approximately frame-shaped application of adhesive. The frame consists of a line 60 composed of individual points running along the circumferential edge of the label L. The label L in this respect has an oval shape.

What is claimed is:

1. A rotary application head for applying hot melt adhesive to a passing label strip material comprising:

a housing having a cylindrical chamber passing through the housing and an axially parallel application gap;

a vertical feed cylinder arranged coaxially in the cylindrical chamber to form a cylindrical annular space interrupted by the axially parallel application gap, wherein the vertical feed cylinder includes at least one feed channel system running parallel to the application gap; and a rotationally drivable mask cylinder arranged in the cylindrical annular space including outlet openings, wherein the outlet openings controllably expose the at least one feed channel system in the feed cylinder to the axially parallel application gap during rotation;

wherein the rotationally drivable mask cylinder is configured to apply the hot melt adhesive during contact thereof with the passing label strip material.

2. The rotary application head according to claim 1, wherein at least one feed channel system in the feed cylinder comprises at least one axially parallel or coaxial central channel and at least one axially parallel row of radial feed holes which lead from the central channel to the surface of the feed cylinder.

3. The rotary application head according to claim 2, wherein the central channel is connected to an exterior annular groove via a plurality of radial holes and the annular groove is connected to a housing hole supplied with liquid adhesive.

4. The rotary application head according to claim 1, wherein the vertical feed cylinder is rotatably adjustable and comprises a plurality of feed systems comprising rows of feed holes wherein the feed systems can be adjusted to the circumferential position of the axially parallel application gap.

5. The rotary application head according to claim 4, wherein the length of the rows of feed holes is different.

6. The rotary application head according to claim 4, wherein both sides of a row of feed holes of a feed system in the vertical feed cylinder have elastically supported closure strips which abut against the mask cylinder.

7. The rotary application head according to claim 1, wherein provided in one or both of the housing and the vertical feed cylinder are wiper devices running parallel to the axially parallel application gap for acting on the rotating mask cylinder before the outlet into the application gap.

8. The rotary application head according to claim 1, wherein a plurality of axially parallel rows of outlet openings are formed in the mask cylinder and distributed unequally over the circumference of the mask cylinder.

9. The rotary application head according to claim 1, wherein at least two rings of outlet openings formed in the mask cylinder extend over the circumference.

10. The rotary application head according to claim 1, wherein lines of outlet openings are formed in the mask cylinder that define a closed curve when unwound.

11. The rotary application head according to claim 1, wherein the rotationally drivable mask cylinder defines an outer circumference extending outwardly of the housing through the application gap.

12. A labelling installation for applying labels to cylindrical bodies, such as bottles, comprising:

an unrolling device for label strip material;

a rotationally drivable vacuum drum for supplying label strip material or individual labels;

a cutting device for separating individual labels from label strip material;

a rotating application head for liquid adhesive, wherein the rotating application head cooperates with the vacuum drum, the rotating application head further comprising:

a housing with a cylindrical chamber that passes through an axially parallel application gap defined through the housing;

a vertical feed cylinder arranged coaxially in the cylindrical chamber that forms a cylindrical annular space interrupted by the axially parallel application gap; and a feed channel system running parallel to the axially parallel application gap; and a mask cylinder arranged rotatably drivably in the cylindrical annular space, the mask cylinder having outlet openings that exposes in a controlled fashion during rotation the feed channel system in the vertical feed cylinder through the axially parallel application gap;

a carousel for passing the cylindrical body past the vacuum drum, the carousel further including a bottle carrier for the cylindrical bodies, wherein the bottle carrier brings about a rolling of the cylindrical bodies on the vacuum drum; and a device adapted to charge and discharge the cylindrical bodies onto and from the carousel;

wherein:

the axes of the vacuum drum, rotary application head and carousel are arranged parallel to one another, and the mask cylinder is configured to apply the liquid adhesive during contact thereof with the passing label strip material.

13. The labelling installation according to claim 12, wherein the rotary drives of the vacuum drum and the mask cylinder are mechanically coupled.

14. The labelling installation according to claim 12, wherein the drives of the vacuum drum and the carousel are mechanically coupled using rotational means.

15. The labelling installation according to claim 12, wherein the vertical feed cylinder is rotationally adjustable and comprises a plurality of feed systems with respectively one row of feed holes, wherein the feed systems can be adjusted to the circumferential position of the application gap.

16. The rotary application head according to claim 15, wherein the length of the rows of feed holes is different.

17. The labelling installation according to claim 15, wherein the feed cylinder is adjustably drivable by a servomotor via a pulley.

18. The labelling installation according to claim 12, wherein both sides of a row of feed holes of a feed system in the feed cylinder include elastically supported closure strips that abut against the mask cylinder.

19. The labelling installation according to claim 12, wherein provided in one or more of the housing and feed cylinder are wiper devices running parallel to the application gap that act on the rotating mask cylinder before the outlet into the application gap.

20. The labelling installation according to claim 12, wherein a plurality of outlet openings are formed in the mask cylinder and distributed unequally over the circumference.

21. The labelling installation according to claim 12, wherein at least two rings of outlet openings formed in the mask cylinder extend over the circumference.

22. The labelling installation according to claim 12, wherein lines of outlet openings are formed in the mask cylinder that define a closed curve when unwound.

23. The labeling installation according to claim 12, wherein the mask cylinder defines an outer circumference extending outwardly of the housing through the application gap.

* * * * *